Figure 1:
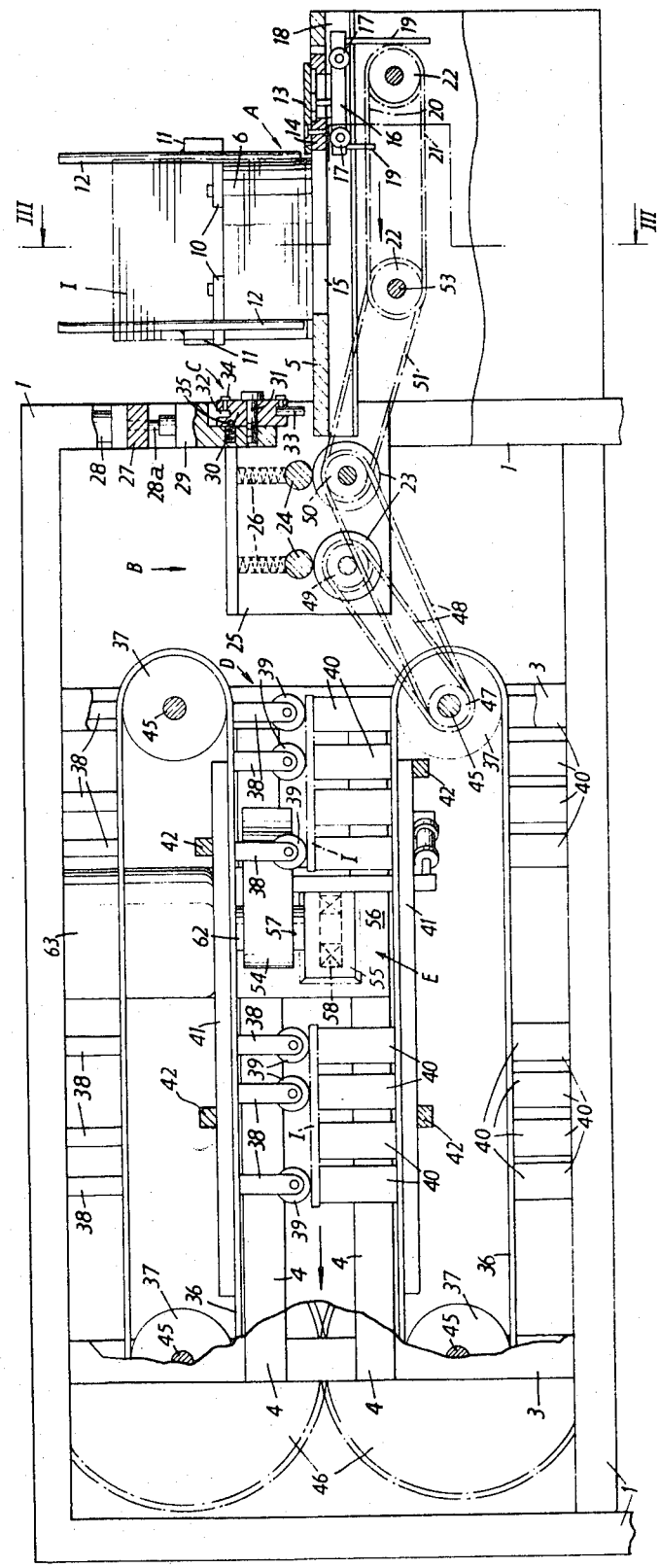

United States Patent

[11] 3,631,553

| [72] | Inventor | Islaye Holland |
| | | Littlethorpe, England |
| [21] | Appl. No. | 882,859 |
| [22] | Filed | Dec. 8, 1969 |
| [45] | Patented | Jan. 4, 1972 |
| [73] | Assignee | USM Corporation |
| | | Boston, Mass. |

[54] MANUFACTURE OF SHOE COMPONENTS
3 Claims, 5 Drawing Figs.

[52] U.S. Cl. ........................................ 12/1 A
[51] Int. Cl. ........................................ A43d
[50] Field of Search ............................. 12/1, 17, 86.6, 86.7

[56] References Cited
UNITED STATES PATENTS

| 2,443,877 | 6/1948 | Valin | 12/1 X |
| 2,943,337 | 7/1960 | Sweeney | 12/86.7 |
| 3,056,150 | 10/1962 | Fleischer | 12/1 X |
| 3,110,916 | 11/1963 | Fladeland et al. | 12/1 X |
| 3,147,500 | 9/1964 | Ralphs | 12/1 X |

*Primary Examiner*—Patrick D. Lawson
*Attorneys*—Clarkson and Taylor, Richard A. Wise and Cornelius A. Cleary ABSTRACT: A machine for automatically processing shoe soles which comprises a conveyor system for successively feeding individual soles through stations along the system, any desired combination of apparatus mounted at the stations for automatically performing different operations on the soles, and a device for holding a stack of soles and for automatically feeding them individually to the conveyor system. In a particular example, the machine is provided with an apparatus for stamping soles and an apparatus for performing an operation such as skiving or trimming on the edge portions of soles.

MANUFACTURE OF SHOE COMPONENTS

This invention relates to the manufacture of shoe components, the term shoe being used herein to denote boots, shoes and any other appropriate footwear.

In particular, the invention is concerned with a machine for use in the processing of shoe soles, which term is intended to include sole blanks, sole units, combined heel and sole units, shoe bottom units and insoles for subsequent use in the manufacture of shoes.

The object of the invention is to provide a machine which is so constructed that it can be readily adapted, simply by the addition of appropriate equipment, to perform a number of different operations on shoe soles automatically and in succession.

Broadly considered, the machine according to the invention comprises a base structure which carries a conveyor system adapted to engage the faces of individual shoe soles and to feed the latter, appropriately orientated, in succession along it, and which is adapted to have removably mounted thereon at suitably spaced stations along the conveyor system a number of apparatus for automatically performing different operations on the soles as they are fed through the stations.

Thus, the idea underlying the invention is that a number of different sole processing operations selected according to requirements, can all be performed automatically in a single machine without the necessity for handling of the soles between operations as is the conventional practice where separate machines are used and the soles are carried by hand between the machines. This eliminates the expense of separate machines and equipment and also reduces labor costs. The machine enables shoe soles to be processed quickly and easily since the various operations performed thereon are effected in succession without interruption. Moreover, since it is the faces of the soles which are engaged by the conveyor system, their edges are free for any operation to be performed on them by an apparatus fitted to the machine.

The kinds of processing apparatus mounted on the basic machine will usually depend on the requirements of the customer concerned, and usually the machine will be adapted to perform two or three operations on shoe soles.

The machine is conveniently adapted to have mounted on it any desired, suitable combination of apparatus selected from a wide range of processing apparatus such as apparatus for performing an operation on the edge portions of the soles, for example skiving apparatus for skiving marginal edge portions of the soles, bevelling apparatus for bevelling the edges of the soles and trimming apparatus for trimming the edges of the soles to give them the required edge contour; cleaning apparatus for cleaning the edges of the soles, for example after edge trimming thereof; inking apparatus for inking the edges of the soles to give them the required finish; reducing apparatus for reducing the thickness of the soles at appropriate areas; apparatus for stamping the soles, e.g. with the size; apparatus for applying adhesive to the soles; apparatus for forming channels in the soles to receive reinforcing shanks, and apparatus for performing any other appropriate operation on the soles. The particular kinds of apparatus fitted to a machine will, of course, be arranged at stations in an appropriate order along the conveyor system.

Manifestly, a skiving apparatus is adapted to skive each sole around the whole or a part of the marginal edge portion of one face thereof so that the edge is considerably reduced in width. A bevelling apparatus is adapted to bevel the edge of each sole so that it is inclined to the faces of the sole. A trimming apparatus is used to remove any rough projections from the edge of each sole and may be adapted, if desired, to provide the edge with a pattern. An adhesive applying apparatus is adapted to apply adhesive to one of the faces of each sole, i.e. that face which has been skived or reduced. A channelling device is adapted to form a longitudinal channel in one face of each sole at the location to be disposed between the sole portion proper and the heel of the shoe to which the sole is to be applied, this channel receiving a metal reinforcing shank. A reducing apparatus may comprise a number of skiving devices arranged one after another along the conveyor system, each device being adapted to skive a particular area of the face concerned of each sole, or may be a so-called through sole reducing apparatus comprising a matrix roller, a cooperating plain roller and a knife blade disposed close to the nip of the two rollers.

Figure 2:
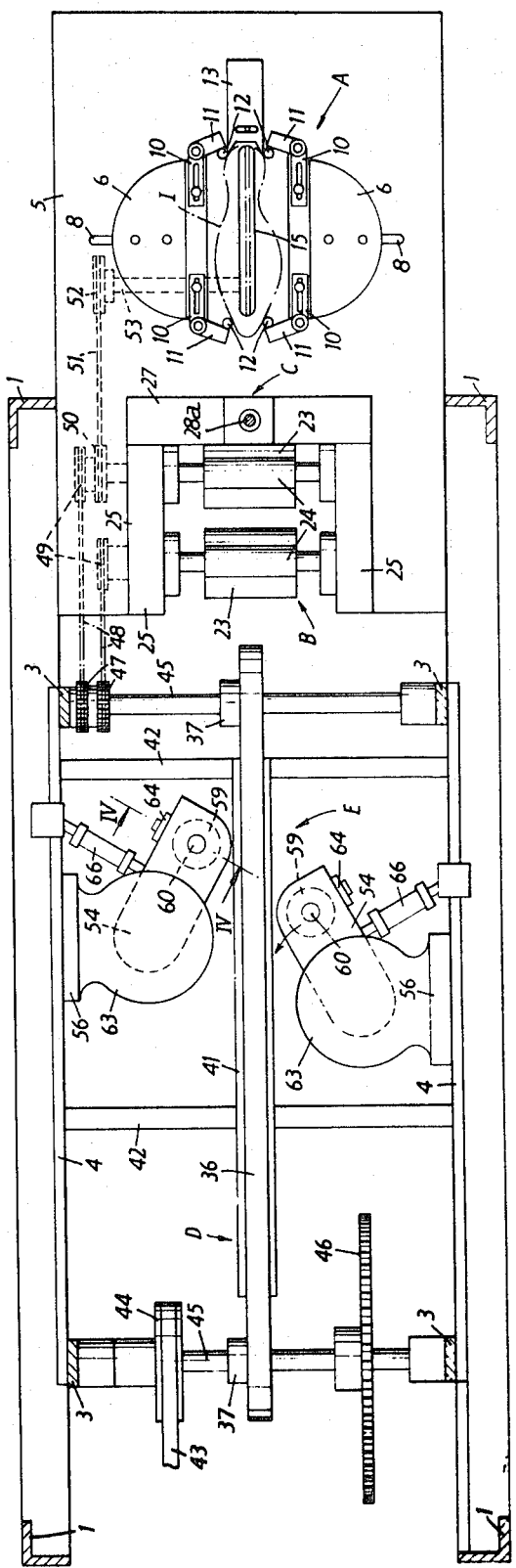
Figure 3:
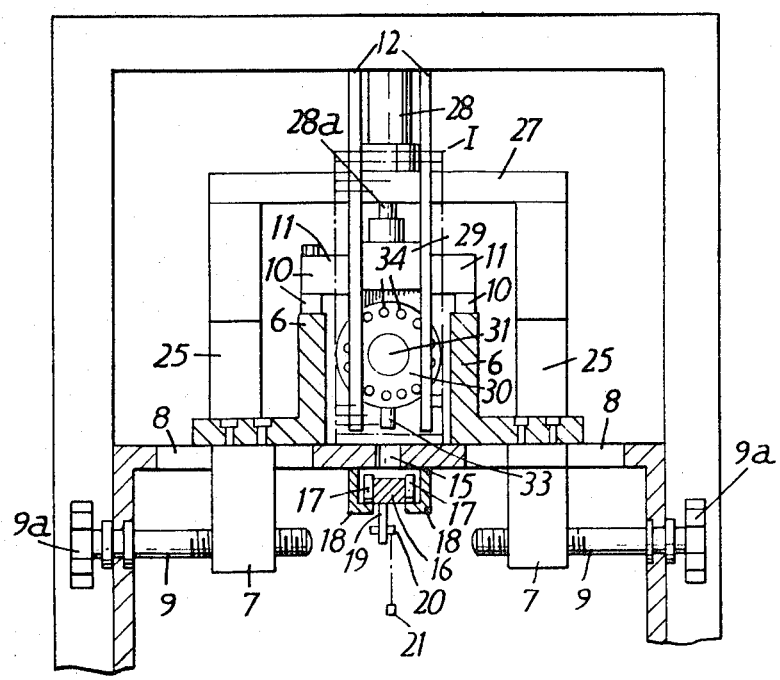
Figure 4:
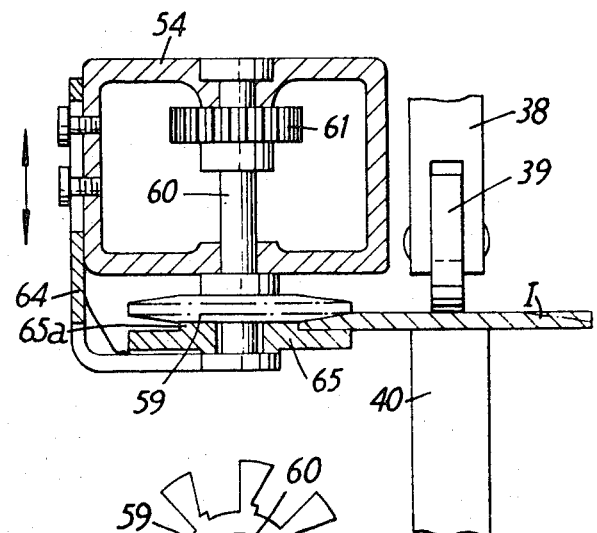
Figure 5:
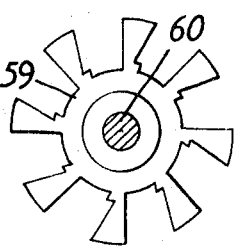

A specific constructional example of a machine according to the invention, equipped with apparatus for size stamping and skiving insoles, will now be described with reference to the accompanying drawings, in which:

FIG. 1 is a side elevational view of the machine, partly cut away and partly in section, FIG. 2 is a plan view of the machine, FIG. 3 is a vertical cross section taken on the line III—III of FIG. 1, FIG. 4 is a detailed sectional view taken on the line IV—IV of FIG. 2, and FIG. 5 shows the cutter of one of the skiving apparatus.

The basic machine illustrated in the drawings has a base structure 1 which carries vertical sideplates 3 having longitudinal, spaced bars 4 extending between them, and a feed table 5.

The feed table has associated therewith a feed device generally designated A in which a stack of insoles I is to be mounted and which is adapted to extract the insoles individually and in succession from the stack and feed them to two pairs of feed rollers generally designated B and also associated with the feed table. Mounted above the feed table is a size stamping apparatus C arranged to stamp each insole during its travel from the apparatus A to the rollers B. The feed rollers B feed the insoles to a main conveyor D carried by the base structure, and this conveyor has associated therewith a skiving apparatus generally designated E which is adapted to skive the marginal edge portion of one face of each insole as it is fed along the conveyor.

Feed Device 'A'

Referring to FIGS. 1, 2 and 3, the feed device comprises two sideplates 6 arranged at opposite sides of the stack and each provided with a depending lug 7 which projects through a slot 8 in the feed table and has a screw 9 passing through it, whereby the plates can be adjusted towards and away from one another by appropriately turning the handles 9a of the screws 9. The top of each sideplate has mounted thereon at each end a bar 10 which is secured to the plate by a bolt passing through a slot in the bar, whereby the latter is adjustable longitudinally. Each bar has pivotally mounted thereon by means of a bolt an arm 11 which carries at its outer end a vertical rod 12, the arm therefore being pivotable to adjust the position of the rod relatively to the bar. Thus, by adjusting the sideplates, the bars and the arms, the four rods 12 can be located in engagement with the stack of insoles I at the front and the rear thereof, thereby to hold the insoles in superimposed alignment. The adjustability enables insoles of different shapes and sizes to be catered for.

Feeding of the insoles from the stack is effected by means of a reciprocatory feed plate 13 which is of a thickness slightly less than the thickness of an insole, whereby on each advance of the feed plate it pushes the lowermost insole forwardly into the nip of the first pair of rollers B which then take over its feed, the feed plate then returning to a rear position clear of the stack ready to perform the next stroke. The feed plate is operated continuously, to produce a continuous supply of insoles to the conveyor system.

The feed plate 13 is secured by a bolt passing through a transverse slot therein to a support 14 which is slidable in a longitudinal slot 15 formed in the feed table, and this support 14 is in turn secured by a bolt passing through a longitudinal slot therein to a slide 16. Thus, the feed plate is adjustable both transversely and longitudinally relatively to the slide so that it can be correctly positioned to handle insoles of different shapes and sizes. The slide 16 is slidable through the medium of ball bearing races 17 between two guides 18 secured to the underside of the feed table. Depending from the slide are two spaced pins 19 of different lengths, and these are arranged to be acted upon by a pin 20 projecting laterally from a continuously driven endless chain 21 which runs around two reversing sprockets 22. Thus, the shorter pin 19 is engaged by the pin 20 along the upper section of the endless chain to advance the feed plate, whereupon the pin 20, on its return movement along the lower section, engages the longer pin 19 to bring the feed plate back to its starting position.

The endless chain is arranged so that it can be lowered whilst it is running to move the pin 20 away from the pins 19, whereby the feed plate can be stopped to enable a fresh stack of insoles to be placed in position.

Feed Rollers 'B'

It will be observed that the feed table 5 is cut away at its front end to accommodate the feed rollers. There are two pairs of feed rollers arranged one after the other so that they successively take over the feed of each insole, the second pair then conveying the insole to the main conveyor D which is at an appropriate spacing from them. Each pair of feed rollers consists of a lower roller 23 which is provided with a covering of a frictional material, and an upper metal roller 24 of smaller diameter. The lower rollers 23 are mounted in bearings carried by the feed table and are driven from a common drive (see below). The upper rollers 24 are not driven and are mounted in bearings which are vertically slidable in slots formed in sideplates 25 mounted on the table at opposite sides of the cut out portion, the bearings being urged downwardly by springs 26 accommodated in the slots, so that each insole is resiliently and frictionally gripped by the respective pairs of rollers.

Size Stamping Apparatus 'C'

This apparatus is mounted on a crosspiece 27 supported by the sideplates 25. It comprises a pneumatic piston/cylinder unit 28 mounted above the crosspiece with its piston rod 28a projecting down through the latter and carrying at its lower end a bracket 29 which carries a die holder 30. This die holder is in the form of a disc mounted for turning on a pin 31 fixed to the bracket 29 and formed around its periphery with a series of regularly spaced holes 32 for receiving stamping dies 33 corresponding to different sizes, each die being secured in position by a screw 34. The rear face of the die holder is formed with an annular series of recesses corresponding to the holes 32, and a spring-biased plunger 35 carried by the bracket is arranged to engage in the recess diametrically opposite the die which is in use, i.e. the lowermost die. Thus, different dies can be brought into use by turning the die holder, whereupon the plunger 35 automatically disengages from the recess concerned and then engages in the recess opposite the die brought into the operative position thereby to hold the holder against further turning. The supply of fluid to the unit 28 is controlled by a solenoid valve operated by a cam-actuated microswitch in time with the feed of insoles through the machine, whereby as each insole comes to a position beneath the die holder, the unit is operated to bring the die concerned rapidly and forcibly down into engagement with the insole thereby to stamp the latter, the insole being, of course, supported by the feed table. The die holder is then rapidly returned to its upper rest position so that the feed of the insole to the feed rollers is not interrupted.

Main Conveyor 'D'

The main conveyor comprises two endless conveyor chains 36 each of which runs round two reversing sprockets 37 and which are arranged one above the other with the lower straight section of the upper conveyor chain in close parallel relationship to the upper straight section of the lower conveyor chain. The upper conveyor chain is fitted with five regularly spaced sets, each of three, dogs in the form of plates 38 carrying rollers 39, whereas the lower conveyor chain is fitted with five regularly spaced sets, each of four, dogs in the form of blocks 40. The arrangement is that each insole discharged from the feed rollers 'B' is picked up by two sets of dogs 39, 40 which come into opposed relationship along the straight section of the conveyor, and is gripped between the dogs concerned. Thus, the insoles are conveyed along the said straight section held in this way, i.e. with their faces engaged by the dogs 39, 40 and their marginal edge portions free, and are automatically discharged at the end of the section as the two sets of dogs move apart.

The upper chain 36 runs along its lower section beneath a guide rail 41, and the lower chain runs along its upper section above a guide rail 41, these rails being carried by crossmembers 42 mounted on the longitudinal sideplates 4 of the base structure. Provision is made for vertical adjustment of the rails 41 to vary the spacing of the said sections of the chains 36 and hence the grip on the insoles, this catering for insoles of different thicknesses.

In a modified form of the main conveyor, the upper conveyor chain may be eliminated, and a series of rollers provided in its place, these rollers, similar to the rollers 39, being arranged so that the insoles are gripped between them and the dogs 40 on the lower conveyor chain.

Machine Drive

The feed apparatus A, the feed rollers B and the main conveyor D are all driven by a common drive motor (not shown) mounted beneath the conveyor. This motor is connected by a belt 43 to a pulley 44 mounted on a shaft 45 carrying the front sprocket 37 of the lower conveyor chain. This shaft also carries a large sprocket 46 which meshes with a similar sprocket on a shaft 45 carrying the front sprocket 37 of the upper conveyor chain, so that the two chains are driven in unison. The shaft 45 carrying the rear sprocket 37 of the lower conveyor chain also carries two sprockets 47 which are respectively connected by endless chains 48 to two sprockets 49 coupled to the shafts of the lower feed rollers 23, so that the latter are driven in time with the main conveyor. The shaft of the rear lower feed roller 23 carries a further sprocket 50 which is connected by an endless chain 51 to a sprocket 52 which is carried by a shaft 53 on which the front sprocket 22 of the endless chain 21 is mounted, whereby the feed plate is also driven in time with the machine.

Skiving Apparatus

This apparatus is arranged to skive the insoles as they travel along the main conveyor D. Referring to FIGS. 1, 2, 4 and 5, it comprises two hollow arms 54 which are disposed at opposite sides of the path of travel of the insoles and each of which is mounted at one end for turning about a vertical axis on a bearing support 55 carried by a plate 56 which is mounted for vertical adjustment (to correctly position the skiving apparatus) on the longitudinal sideplates 4. Thus, each arm is furnished with a depending stem 57 which is turnable in bearings 58 in the associated bearing support. The arms 54 are disposed one in advance of the other and extend rearwardly of the machine. Each arm carries at its outer end a rotary cutter 59 which is of the form shown in FIG. 5. This cutter is mounted on the lower end of a vertical spindle 60 mounted in the arm and connected by a gear train 61 to the drive spindle 62 of a drive motor 63. The latter is mounted on the aforesaid plate 56 with its depending drive spindle coaxial with the stem 57, so that the arm can pivot without interfering with the drive to the cutter, the drive spindle extending into the hollow arm. Each arm carries at its outer end a bracket 64 which is secured to the arm by bolts passing through a vertical slot in the bracket, and which carries a freely rotatable roller 65 arranged coaxially below the cutter. This roller is formed with a lip 65a, and the arrangement is that the marginal edge portion of each insole 1 is engaged between the cutter and the roller (as shown in FIG. 4) so that the cutter skives the upper marginal edge surface, the thickness of the edge of the insole being determined by the depth of the lip 65a of the roller. The bracket 64 is adjustable vertically to allow the cutter to be removed and either reversed or replaced.

The arms 54 are each automatically movable in and out to engage each insole, skive it and then disengage the latter, by means of a pneumatic piston/cylinder unit 66 the cylinder of which is pivotally connected to an adjacent longitudinal sideplate 4 and the piston of which is connected to a rod depending from the outer end of the arm concerned. The two units 66 are controlled by solenoid valves which are operated by cam-actuated microswitches in time with the operation of the machine. It will be noted that the cutters engage the front and rear ends of each insole by an overlapping amount.

A bag may be provided beneath each cutter to catch the waste material skived off the insoles, and a dust extractor may be provided to deal with any fine dust produced in the cutting operation.

The treated insoles discharged from the main conveyor D may be directed into a receptacle.

If a further operation is required to be performed on the insoles after they leave the main conveyor, the machine may be provided with one or more pairs of cooperating rollers or a conveyor belt arranged to take the insoles from the main conveyor and to feed them to an apparatus for effecting this further operation.

It is to be noted that this machine has the advantage that insoles can be easily skived in the manner described and are accordingly such that in cement lasting a better adhesion of shoe uppers to them can be achieved than has been possible heretofore where only edge bevelling has been available.

The machine illustrated in the drawings can be simply adapted for edge trimming sole blanks (as well as stamping them). All that is required is replacement of the cutters 59 and the cooperating rollers 65. Rollers will be provided merely for supporting the sole blanks as they are fed through the edge trimming station, i.e. rollers without lips 65a, and cutters will be provided for cutting the edges of the sole blanks—not the faces thereof.

Indeed, little alteration to the machine is required in order to adapt it for performing any operation on the edge portions of soles.

I claim:

1. A machine for use in processing shoe soles which comprises a base structure carrying a conveyor system comprising two endless linear elements arranged to travel in spaced parallel relationship one above the other along at least one straight section of their paths of travel and means for driving each of the elements in an endless path, the said elements being provided at suitable intervals therealong with dogs arranged to come into opposed, spaced relationship along the said straight section to grip individual shoe soles and convey them appropriately oriented along the said section of the conveyor system, and means for removably mounting on the base structure at suitably spaced stations along the conveyor system a number of apparatuses for automatically performing operations on the soles as they are thus gripped and fed through the station.

2. A machine according to claim 1 wherein means are provided for holding a plurality of soles in a stack for feeding individually to the conveyor system, said holding means comprising two sideplates which are arranged at opposite sides of a location for mounting a stack of soles and are provided at the front and rear ends with four vertical rods arranged to engage the stack of soles at the sides of the front and rear thereof and hold them in vertical alignment, the sideplates and rods being adjustable for directing the soles between said dogs.

3. A machine according to claim 1, which is provided at a station along the conveyor system with an apparatus for stamping soles, this apparatus comprising a rigid support for supporting a sole at this station, a die holder, and a pneumatic piston and cylinder unit mounted on the base structure with its piston connected to the die holder, for rapidly and forcibly bringing a stamping die mounted in the holder into engagement with a sole on the support.

* * * * *